(12) United States Patent
Eckert

(10) Patent No.: US 8,016,707 B2
(45) Date of Patent: *Sep. 13, 2011

(54) MACHINE TOOL COMPRISING A ROTARY TRANSMISSION LEADTHROUGH BETWEEN THE DRIVEN GEAR AND THE SPINDLE

(75) Inventor: Harald Eckert, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 933 days.

This patent is subject to a terminal disclaimer.

(21) Appl. No.: 11/914,397

(22) PCT Filed: May 16, 2006

(86) PCT No.: PCT/EP2006/004595
§ 371 (c)(1),
(2), (4) Date: Nov. 14, 2007

(87) PCT Pub. No.: WO2006/122743
PCT Pub. Date: Nov. 23, 2006

(65) Prior Publication Data
US 2008/0184834 A1    Aug. 7, 2008

(30) Foreign Application Priority Data
May 18, 2005  (DE) .................. 10 2005 022 713

(51) Int. Cl.
*F16H 57/04* (2010.01)
(52) U.S. Cl. ....................................... 475/159
(58) Field of Classification Search .................. 475/161, 475/159; 408/57
See application file for complete search history.

(56) References Cited

U.S. PATENT DOCUMENTS

| | | | | |
|---|---|---|---|---|
| 2,521,239 A | * | 9/1950 | McDowall et al. | 475/120 |
| 2,865,227 A | * | 12/1958 | Kelley et al. | 477/53 |
| 5,145,298 A | * | 9/1992 | Marantette | 409/135 |
| 5,290,130 A | | 3/1994 | Beretta | |
| 5,322,494 A | * | 6/1994 | Holtey et al. | 483/12 |
| 5,782,586 A | * | 7/1998 | Geissler | 408/56 |
| 5,799,692 A | | 9/1998 | Gobell et al. | |
| 5,921,731 A | * | 7/1999 | Chandrasekar | 409/231 |
| 6,122,808 A | * | 9/2000 | Popp | 29/49 |
| 6,216,798 B1 | * | 4/2001 | Riello et al. | 173/152 |
| 6,605,019 B1 | | 8/2003 | Eckert | |
| 6,981,825 B2 | * | 1/2006 | Sugata et al. | 409/136 |
| 7,252,615 B2 | * | 8/2007 | Kempf | 475/159 |
| 7,293,943 B1 | * | 11/2007 | Matsumura et al. | 409/136 |
| 7,360,977 B2 | * | 4/2008 | Eckert | 409/231 |
| 7,704,022 B2 | * | 4/2010 | Petrescu | 409/231 |
| 2009/0098972 A1 | * | 4/2009 | Eckert | 475/159 |

FOREIGN PATENT DOCUMENTS

| | | |
|---|---|---|
| DE | 42 20 310 A1 | 12/1993 |
| DE | 195 25 343 A1 | 1/1997 |
| DE | 203 11 730 U1 | 11/2003 |
| DE | 10 2004 003 685 A1 | 8/2005 |
| EP | 0 105 860 A2 | 4/1984 |
| JP | 2004-84692 | 3/2004 |
| WO | WO-00/63589 | 10/2000 |
| WO | WO-2005/011910 A1 | 2/2005 |
| WO | WO-2005/108006 A1 | 11/2005 |

* cited by examiner

*Primary Examiner* — Dirk Wright
(74) *Attorney, Agent, or Firm* — Daivs & Bujold, P.L.L.C.

(57) ABSTRACT

A machine tool gear mechanism (1) such as a spindle gear mechanism, transmits torque from an output shaft (3) of the gear mechanism directly to a spindle (6). The mechanism includes a rotary passage (14) as a device for delivering coolants, emulsions, oils or air between the output shaft (3) or the motor and the spindle (6). The rotary passage (14) is integrated in the spindle (6).

15 Claims, 2 Drawing Sheets

MACHINE TOOL COMPRISING A ROTARY TRANSMISSION LEADTHROUGH BETWEEN THE DRIVEN GEAR AND THE SPINDLE

This application is a national stage completion of PCT/EP2006/004595 filed May 16, 2006, which claims priority from German Application Serial No. 10 2005 022 713.9 filed May 18, 2005.

FIELD OF THE INVENTION

The present invention relates to a machine tool gear mechanism, particularly a spindle gear mechanism.

BACKGROUND OF THE INVENTION

From the state of the art, such machine tool gear mechanisms are known. They typically comprise a two-stage planetary gear system and a corresponding shifting device, such as that described in WO 00/63569, so that rotational speed differentials in the gear ratio are produced between the input or the motor shaft and the output. The torque is transmitted from the output shaft of the gear mechanism directly to the spindle, wherein the spindle is preferably disposed co-axially to the output shaft. In such gear mechanisms, the output shaft is directly connected to the spindle; the rotationally fixed connection between the spindle and output shaft may be achieved with positive or non-positive fit. Hereby, it is necessary to provide a delivery device for coolants, emulsions, oils or air between the gear mechanism output and the spindle.

From DE 42 20 310 C2 a working spindle of a machine tool is known, where the spindle and the bearings of the spindle in the machine tool head are cooled by a forced air stream, the volume of the air current is proportional to the rotational speed of the spindle and where a turbine or nozzle wheel is provided for producing the air current. The wheel is effectively connected to the spindle.

For machine tool gear mechanisms known from the state of the art it has been proposed (older German patent application by the Applicant DE 102 004 003 685.3) to integrate a rotary passage in the gear mechanism output shaft, the passage serving as a delivery device for coolants, emulsions, oils or air between the gear mechanism output and the spindle. A dynamic sealing point is provided for absorbing the volumes and the resulting pressure. The rotary passage is integrated in the output shaft and comprises two sealing disks, which serve as the sealing point and as a device for absorbing rotational speed differentials. The sealing disks may comprise different materials and/or have different geometries and fastening elements as a function of the medium, the developing pressure and the volume flows.

In this design, the influence of the out-of-balance value, which is caused by the imprecise output shaft bearings compared to the spindle bearings, is negatively influenced due to the integration of the rotary passage in the output shaft.

It is, therefore, the object of the invention to provide a machine tool gear mechanism, particularly a spindle gear mechanism, wherein torque is transmitted from the output shaft of the gear mechanism directly to the spindle, the mechanism comprising a rotary passage for the delivery of coolants, emulsions, oils or air between the gear mechanism output and the spindle, wherein the influence of the out-of-balance value is reduced compared to the state of the art. Furthermore, simple assembly is to be guaranteed.

SUMMARY OF THE INVENTION

Accordingly, a machine tool gear mechanism is proposed, particularly a spindle gear mechanism, where torque is transmitted from the output shaft of the gear mechanism directly to the spindle; the mechanism comprising a rotary passage as a delivery device for coolants, emulsions, oils or air between the gear mechanism output and the spindle, and the rotary passage is integrated in the spindle.

In the scope of a preferred embodiment of the present invention, the rotary passage is mounted in the spindle and comprises two sealing disks, which serve as the sealing point and as a device for absorbing rotational speed differentials. The sealing disks may comprise different materials and/or have different geometries and attachments as a function of the medium, the developing pressure and the volume flows.

According to a further development of the invention, the rotary passage comprises a device, for example a spring or a check valve, which presses the sealing disks together so that a pressure increase of the medium does not result in any or only minimal leakage. So as to minimize the wear of the sealing disks, the two sealing disks may be spaced by way of a device, for example a further spring, if no medium flows.

In the event that the gear mechanism comprises a planetary gearset, the rotary passage is connected with the motor-side sealing disk via a pipe, the sun gear of the planetary gear and a hub to the motor shaft or input shaft. The sealing disk on the spindle side may be disposed directly in the spindle or in an additional connecting part, for example in a clutch.

In the scope of an advantageous further development, the rotary passage may be provided with a check valve to prevent the pipe and the connecting lines from completely draining in the depressurized state.

The transmission of torque from the output shaft to the spindle may be achieved directly via a rigid bushing comprising a splined shaft or fitted keys or via a positive or non-positive clutch.

The inventive arrangement of the rotary passage in the spindle has the advantage that the true running accuracy of the spindle is considerably more precise than that of the output shaft. This produces a lower out-of-balance by the mass of the rotary passage, which is a considerable advantage, particularly at high rotational speeds.

Furthermore, it is possible to directly mount the components of the rotary passage in the spindle or install them in the spindle preassembled as a "tube", which results in the advantage of a sub-assembly, that the installation can be tested and, in the event of complaints, the responsibility is clear.

Due to the inventive design, the sealing point is disposed outside of the gear mechanism, which results in the further advantage that leaks can be permitted and fed directly into a tank.

BRIEF DESCRIPTION OF THE DRAWINGS

The invention will now be described, by way of example, with reference to the accompanying drawings in which.

DETAILED DESCRIPTION OF THE INVENTION

Figure 1:
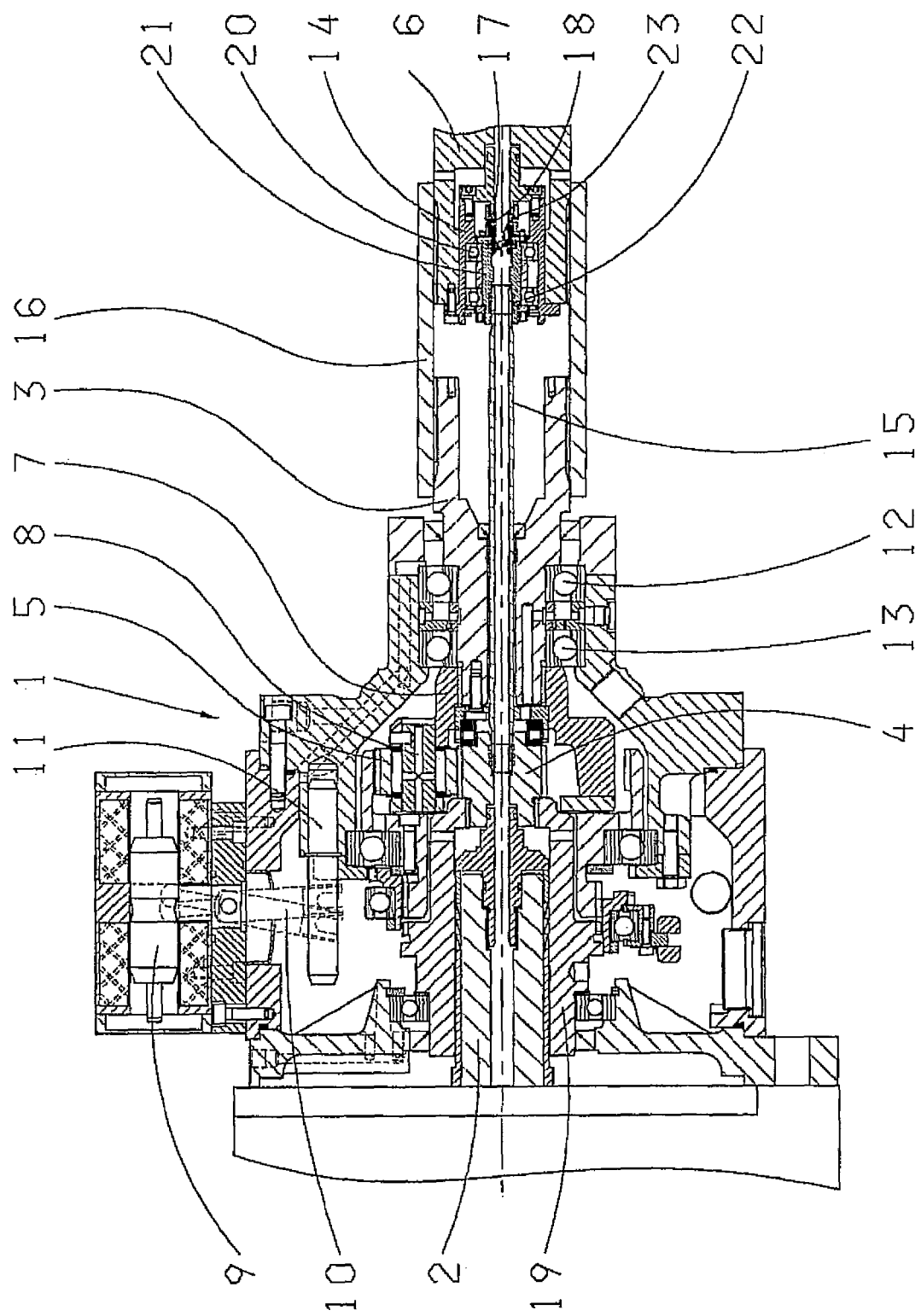
FIG. 1 is a sectional view of a machine tool gear mechanism in planetary design, comprising a rotary passage integrated in the spindle.

FIG. 1 shows a machine tool gear mechanism 1, comprising an input shaft 2, an output shaft 3 and a two-stage planetary gearset disposed in the power flow direction between the input shaft and the output shaft, the planetary gearset comprising a sun gear 4 connected to the input shaft 2, a ring gear 5 supported in the ring gear bearing and a planet carrier 7 with planets 8, the carrier forming the output of the planetary gearset.

The shifting unit of the gear mechanism 1 comprises a solenoid 9, which acts on a shifting fork 10 via a selector shaft 11. In the illustrated example, the output shaft 3 is supported by way of bearings 12, 13 and connected to a spindle 6 via a rigid bushing 16, which engages, via internal gears, the corresponding external gears of the output shaft 3 and the spindle 6. Alternatively to the rigid bushing 16, the connection between the output shaft 3 and spindle 6 can be established via a positive or non-positive clutch.

Figure 2:
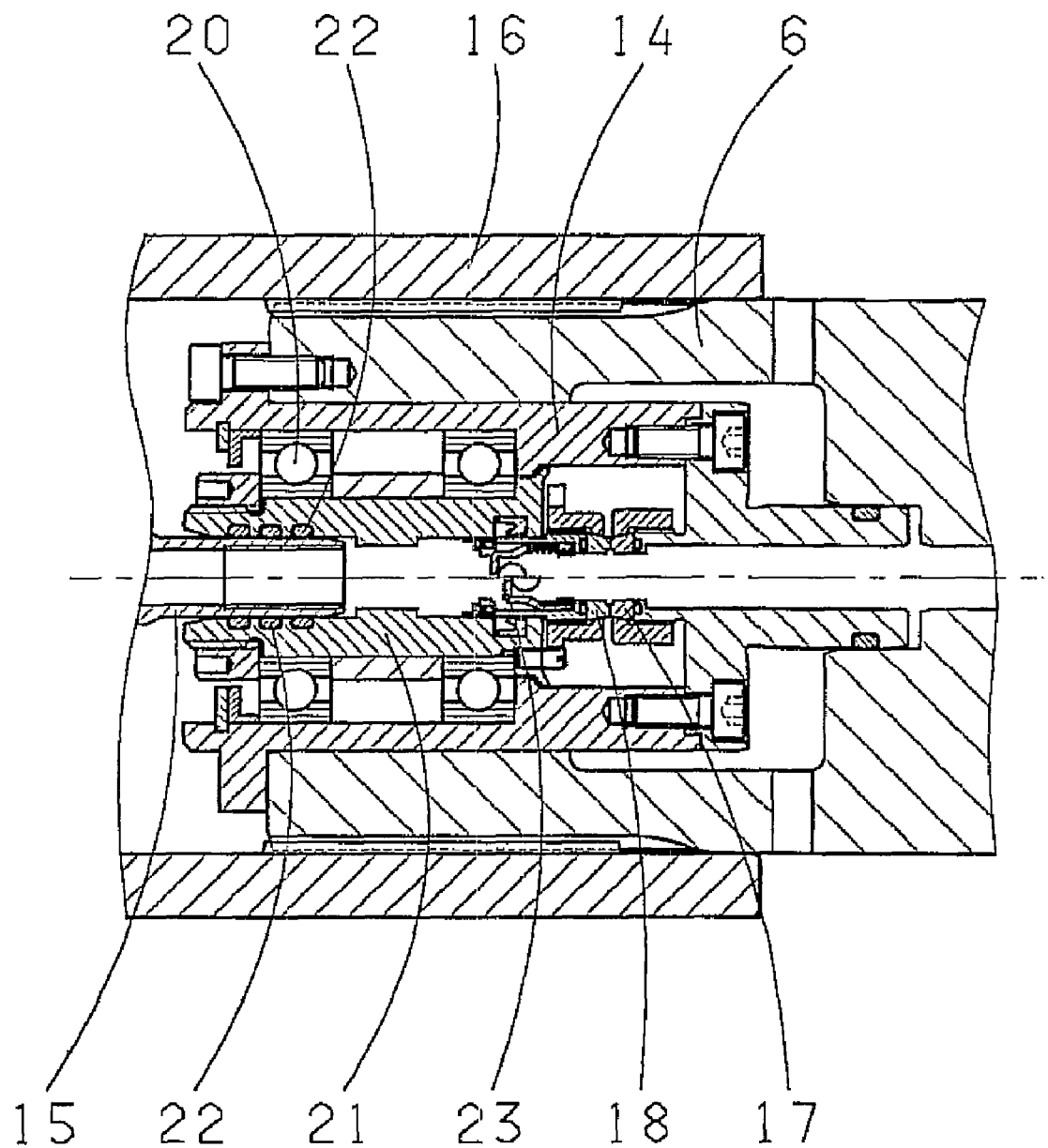
FIG. 2 is an enlarged view of the rotary passage according to FIG. 1.

With reference to FIGS. 1 and 2, a rotary passage 14 is integrated in the spindle 6, the passage serving as a delivery device for coolants, emulsions, oils or air between the gear mechanism input 2 and the spindle 6.

The rotary passage is supported in the spindle 6 and comprises two sealing disks 17, 18, which serve as the sealing point and as a device for absorbing rotational speed differentials. The sealing disk 18 is configured as a sealing disk on the motor side and the sealing disk 17 as a sealing disk on the spindle side.

The sealing disk 18 on the motor side is connected via a pipe 15, the sun gear 4 and a hub 19 to the motor shaft or input shaft 2. The sealing disk 17 on the spindle side may be disposed directly in the spindle 6 or in an additional connecting part, for example in a clutch.

The housing of the rotary passage 14 is preferably supported by way of a bearing 20, which may be configured as a ball, anti-friction, sliding or hydraulic bearing. The bearing is sealed by way of gap rings or contact seals.

FIG. 2 furthermore reveals that the rotary passage 14 comprises a check valve 23, which prevents complete drainage of the supply line or the pipe 15 and of the connecting lines in the depressurized state. The check valve 23 may be held by way of a spring in the depressurized state.

The check valve is provided to apply pressure on the sealing disks.

In the scope of a further embodiment of the invention, which is not shown, a spring is provided in the rotary passage, the spring pressing the sealing disks together.

The spring thus serves to push back the check valve and thus provide defined lifting of the sealing disks. Without the spring, the sealing disks would be slightly pushed apart because of the lateral true running.

Since as a result of the inventive arrangement of the sealing point outside of the gear mechanism leakage is permissible, at least one leakage backflow to a tank (not shown) is provided.

Of course, any design configuration, particularly any spatial configuration of the components of the inventive machine tool gear mechanism and of the rotary passage integrated in the spindle as such, as well as in relation to each other, to the extent they are technically expedient, falls under the scope of protection of the present claims, without influencing the function of the machine tool gear mechanism as described in the claims, even if these embodiments are not explicitly illustrated in the Figures or mentioned in the description.

REFERENCE NUMERALS 1 machine tool gear mechanism
2 input shaft, motor shaft
3 output shaft
4 sun gear
5 ring gear
6 spindle
7 planet carrier
8 planet
9 solenoid
10 shifting fork
11 selector shaft
12 bearing
13 bearing
14 rotary passage
15 pipe
16 rigid bushing
17 sealing disk on spindle side
18 sealing disk on motor side
19 hub
20 bearing
21 pipe
22 O-ring
23 check valve

The invention claimed is:

1. A machine tool gear mechanism in which torque is transmitted from an output shaft of the machine tool gear mechanism directly to a spindle, the machine tool gear mechanism comprising a rotary passage as a delivery device for delivering one of a coolant, an emulsion, oil and air between the machine tool gear mechanism output shaft and the spindle, and the rotary passage (14) being integrated in the spindle (6), a housing of the rotary passage (14) is supported by one of a ball bearing, an anti-friction bearing, a sliding bearing and a hydraulic bearing (20).

2. The machine tool gear mechanism according to claim 1, wherein the rotary passage (14) is integrated within the spindle (6).

3. The machine tool gear mechanism according to claim 1, wherein the rotary passage (14) comprises first and second sealing disks (17, 18) which form a sealing point and a device for absorbing rotational speed differentials between the first sealing disk (17) and the second sealing disk (18), the second sealing disk (18) is arranged closer to a motor than the first sealing disk (17) and the first sealing disk (17) is arranged closer to the spindle (6) then the second sealing disk (18).

4. The machine tool gear mechanism according to claim 3, further comprising a device for biasing the first sealing disk (17) and the second sealing disk (18) together in the rotary passage (14).

5. The machine tool gear mechanism according to claim 4, wherein the device for biasing the first sealing disk (17) and the second sealing disk (18) together is a spring.

6. The machine tool gear mechanism according to claim 3, further comprising a device for separating the first sealing disk (17) and the second sealing disk (18) in the rotary passage (14) if one of the coolant, the emulsion, the oil and the air is not being delivered between the machine tool gear mechanism output shaft and the spindle.

7. The machine tool gear mechanism according to claim 6, wherein the device for separating the first sealing disk (17) and the second sealing disk (18) a spring.

8. The machine tool gear mechanism according to claim 1, wherein the machine tool gear mechanism comprises a planetary gearset and the second sealing disk (18) is connected to one of a motor shaft and an input shaft (2) via a pipe (15), a sun gear (4) and a hub (19).

9. The machine tool gear mechanism according to claim 1, wherein the first sealing disk (17) is located directly on one of the spindle (6) and an additional connecting part.

10. The machine tool gear mechanism according to claim 1, wherein a pipe (21), provided in the rotary passage (14), is a bearing seat and a receiving element for one of oil seals and gap rings which provide a seal.

11. The machine tool gear mechanism according to claim 1, wherein the rotary passage (14) comprises a check valve (23) which prevents, in a depressurized state, one of a supply line, a pipe (15) and connecting lines from completely draining one of the coolant, the emulsion, the oil and the air.

12. The machine tool gear mechanism according to claim 11, wherein in the depressurized state the check valve (23) is held by a spring.

13. The machine tool gear mechanism according to claim 1, wherein the output shaft (3) and the spindle (6) have external gears such that internal gears of a rigid bushing (16) engage with the external gears of the output shaft (3) and the external gears of the spindle (6), via one of feather keys, a positive clutch and a non-positive clutch to couple the output shaft (3) with the spindle (6).

14. A machining tool gear mechanism in which torque is transmitted from an output shaft of the machining tool gear mechanism directly to a spindle, the machining tool gear mechanism comprising:
- a rigid bushing (16) coupling the output shaft (3) of the machining tool gear mechanism to the spindle (6), the rigid bushing (16) having internal gears which engage with external gears of the output shaft (3) of the machining tool gear mechanism and external gears of the spindle (6);
- a rotary passage (14) being located within the spindle (6) and having a first sealing disk (17) and a second sealing disk (18), the first sealing disk (17) communicating with the spindle (6) at an end of a passageway that axially extends through the spindle (6), the second sealing disk (18) communicating with a pipe (15) that extends from the output shaft (3) of the machining tool gear mechanism, the first sealing disk (17) and the second sealing disk (18) being biased together by a first spring to enabling one of a coolant, an emulsion, an oil and air to freely flow through the rotary passage (14) between the output shaft (3) of the machining tool gear mechanism and the spindle (6); and
- a check valve (23) being located within the rotary passage (14) to one of allow and prevent a free flow of the coolant, the emulsion, the oil and the air, between the output shaft (3) of the machining tool gear mechanism and the spindle (6), depending on a pressure within the rotary passage (14), and the check valve (23) being biased by a second spring to close when the rotary passage (14) is essentially unpressurized.

15. A machine tool gear mechanism in which torque is transmitted from an output shaft of the machine tool gear mechanism directly to a spindle, the machine tool gear mechanism comprising a rotary passage (14) as a delivery device for delivering one of a coolant, an emulsion, oil and air between the machine tool gear mechanism output shaft (3) and the spindle (6), and the rotary passage (14) being integrated in the spindle (6), a planetary gearset, and a second sealing disk (18) is connected to one of a motor shaft and an input shaft (2) via a pipe (15), a sun gear (4) and a hub (19).

\* \* \* \* \*